3,544,536
METAL SEALANT CONTAINING OXYALKYL
AMINE ACCELERATOR
Charanjit Rai, Bellwood, and Arthur Frederic Krueger,
Villa Park, Ill., assignors to Broadview Chemical Corporation, a corporation of Illinois
No Drawing. Filed June 20, 1966, Ser. No. 558,595
Int. Cl. C08f 3/62, 15/16, 7/12
U.S. Cl. 260—89.5                                    9 Claims

ABSTRACT OF THE DISCLOSURE

For accelerating a shelf stable room temperature setting sealant composition while retaining shelf stability, accelerators are proposed having the formula $$[H]_mN[(CH_2)_x(OR_1)_yOR_2]_n$$

wherein $m$ and $n$ are each integers 1 to 2 inclusive, the total of $m$ and $n$ is 3, $x$ is an integer 1 to 6 inclusive, $y$ is an integer 0 to 6 inclusive, $R_1$ is a lower alkyl chain and $R_2$ is selected from the class consisting of hydrogen and lower alkyl groups.

---

This invention relates to accelerating the cure of room temperature sealants containing liquid monomer-catalyst mixtures which are shelf stable but capable of setting up at room temperature on confinement between closely facing metal surfaces to adhere the surfaces to each other.

Briefly, the present invention involves the use of certain oxyalkyl amine compounds as accelerators for shelf stable sealant compositions containing a room temperature reactive monomer and a catalyst system for initiating polymerization of the monomer at room temperature.

Shelf stable metal sealant compositions have been formulated for the purpose of bonding closely facing metal surfaces, e.g., threaded joints, in a full range of varying strengths, viscosity, thixotropy and curing or setting rates. Such sealant compositions usually include a room temperature reactive acrylic monomer which is capable of being cured at room temperature within the desired period of time. For example, the acrylic monomer may be an acrylic diester of an ethylene glycol, e.g., a polyethylene glycol as described by L. W. Kalinowski in U.S. Patent No. 3,249,656, entitled "Sealant Composition," patented May 3, 1966; an acrylic ester of a cyclic ether alcohol as described by J. R. Stapleton in application Serial No. 517,321, entitled "Adhesive Composition for Metals and the Like," filed Dec. 29, 1965, now abandoned; an acrylic ester of an amino alcohol such as described in my copending application Serial No. 561,381, entitled "Metal Sealant Containing Amino Acrylic," filed June 29, 1966, now abandoned, and/or mixtures of the above with each other or with other vinylic monomers such as allylic monomers. The disclosures of monomers and the specific examples of such monomers described in the above-identified patent applications are hereby incorporated in this application by reference as examples of sealant compositions which are useful in the practice of the present invention as set out herein. The room temperature reactive monomers are used in an amount sufficient to complete the desired room temperature curing reaction when the catalyzed sealant is confined between the closely facing metal surfaces.

The catalysts for sealant compositions with which the present invention is concerned are usually peroxidic catalysts. Although t-butyl hydroperoxide is a common and conventional peroxidic initiator for ethylenic polymerization generally, it is difficult to initiate polymerization of composition using t-butyl hydroperoxide and it is also difficult to provide high strength grades while still maintaining shelf stability.

It is a general object of this invention to provide new and useful adhesive compositions of the class described; and it is a more particular object to provide a new and useful accelerator system for such adhesives or sealants.

It is another object of this invention to provide new and useful liquid sealant compositions which will set up at room temperature in contact with closely facing metal surfaces within a reasonable time to provide a bond having excellent strength.

Still another object of this invention is to provide a high strength sealant composition which has good stability and an acceptable rate of room temperature cure.

A further object of this invention is to provide a new and useful sealant composition employing a highly advantageous accelerator system.

Other objects of this invention will be apparent from the descriptions given herein.

The useful oxyalkyl amines have the formula $$[H]_m\text{—}N\text{—}[(CH_2)_x(OR_1)_y\text{—}OR_2]_n$$

wherein $m$ and $n$ are each 1 or 2, $m$ plus $n$ equals 3, $x$ is an integer 1 to 6 inclusive, $y$ is an integer 0 to 6 inclusive, $R_1$ represents a lower alkyl chain, e.g., of 1 to 6 carbon atoms inclusive, and $R_2$ is hydrogen or lower alkyl, e.g., $C_1$ to $C_6$ alkyl. Specific examples of suitable oxyalkyl amines are diglycol amine, di-(triethylene glycol) amine and other di-(polyethylene glycol) amines including di-(hexaethylene glycol) amine, methoxypropyl amine, hydroxypropyl amine, methoxymethyl amine, hexyloxyhexyl amine, 2-ethoxy-3, 4-dimethyl hexyl amine, ethoxy - ethoxyethoxyethoxyethoxyethoxyethyl amine, butoxybutoxy amine, ethoxyethoxyhexyl amine, hydroxyhexyloxyhexyloxy butyl amine, di-(hydroxybutoxybutoxy butyl) amine, di-(methoxypropyl) amine, etc.

To prepare the present sealant compositions, it is merely necessary to mix a suitable amount of the oxyalkyl amine compound and peroxide catalyst with the selected reactive monomer or mixture of monomers. Metal containers should not be used because of the chance of premature polymerization. It has been found that the peroxide catalyst, e.g., organic peroxide, including hydroperoxides and peresters, or hydrogen peroxide can be used, e.g., in amounts of .1 to 10 or 15% or more, preferably 1 to 8%, and usually 1 to 3% in the sealant composition. The amount of accelerator may vary from .01 to 10 or more weight percent and an optimum can usually be found between .1 and 5 weight percent depending on the monomer system and peroxide catalyst used. The preferred amount of accelerator is .5 to 2%.

Examples of suitable organic peroxides are cumene hydroperoxide, t-butyl hydroperoxide, methylethylketone hydroperoxide or peroxide, tetralin hydroperoxide, benzoyl peroxide, lauroyl peroxide, ditertiary butyl diperphthalate, and the like. Tertiary butyl hydroperoxide can be advantageously used.

Inhibitors or stabilizers can be added as need to balance or prevent instability of the sealant. Hydroquinone and its ethers, such as p-methoxy phenol are preferred inhibitors and stabilizers because of their availability and effectiveness to inhibit until it is desired to set up sealant composition between the closely facing metal surfaces in the absence of air. Hydroquinone, or an ether thereof, in a total amount of 25 to 1000 p.p.m., more usually 50 to 400 p.p.m., will probably be sufficient to stabilize most sealant compositions containing the ester. Other conventional inhibitors or stabilizers for inhibiting polymerization of vinyl compounds can be used as will be apparent to those in the art.

It is intended that other polymerizable unsaturated esters or other unsaturated monomers such as hydrocarbons, ethers, or other comonomers, or plasticizers such as diisodecyl phthalate or the monobutyl ether of ethylene glycol, can be included in the present sealant compositions to modify the properties of the composition.

Preferred sealant compositions also include a minor amount, e.g., up to 50% of a low molecular weight polymer of an allyl ester of an aromatic polycarboxylic acid, hereinafter referred to as allylic prepolymer, which is soluble in and copolymerizable with the reactive acrylic monomer. These compositions may be conveniently prepared by premixing the acrylic monomer and allylic prepolymer to provide a generally homogeneous mixture preferably prior to addition of catalyst and accelerator. An allylic prepolymer having desirable characteristics as diallyl phthalate which can be obtained under the name "Dapon-35" from Food Machinery Corporation, having the following reported physical properties:

Bulk density—14–16 lbs./cu. ft.
Sp. gr. at 25° C.—1.267
Iodine No.—57
Softening range—85–115° C.

The compositions of this invention are useful in adhering closely facing surfaces, usually metal, to each other. Close contact of the sealant composition with the metal surfaces apparently results in initiating the cure of the monomer by the catalyst and accelerator.

The following examples are offered for the purpose of illustration and are not intended as limiting the invention:

EXAMPLES 1 TO 22

In each of these examples, the ingredients in the amounts indicated in the table below were thoroughly mixed, with the accelerator, cocatalyst (where used) and about 2.5% t-butyl hydroperoxide as catalyst being added and mixed seriatim as the last ingredients, unless otherwise indicated. For ease of reporting the formulations and results, various accelerators, monomers, cocatalysts and sealants base batches have been given code numbers as follows:

| Composition |
| --- |
| Code Number: (1) Accelerators |
| 0122.... Diglycol amine, i.e., 2-(2-aminoethoxy)ethanol. |
| 0201.... Methoxypropylamine. |
| 0204.... Ethoxyethoxyethoxypropylamine. |
| 0206.... Ethoxyethoxypropylamine. |
| (2) Monomers |
| 0133.... Mixed mono- and di-methacrylates of 2,2,4-trimethyl-pentanediol. |
| 203..... Tetrahydrofurfuryl methacrylate. |
| 210..... Polyethylene glycol dimethacrylate (averages tetraethylene glycol dimethacrylate). |
| 1212.... Dimethylaminoethyl methacrylate. |
| (3) Cocatalysts |
| 0115.... N,N-dimethyl formamide. |
| 0325.... N,N-diallyl formamide. |
| 0332.... Succinimide. |
| (4) Sealant base batches |
| 1000.... A batch made by mixing 20 pounds of ethylene glyco dimethacrylate with 20 pounds of a premix (hereafter identified as Premix) containing 73.7% 210 (identified above) and 26.3% diallyl phthalate prepolymer (a solid prepolymer marketed under the name Dapon-35) and inhibited with 100 p.p.m. hydroquinone, and then adding and mixing in 182 g. (about 1%) acrylic acid and 60 g. (about 0.3%) benzoic sulfimide. |
| ATB-1.... A batch made by adding 650 g. of silica, 4 pounds of diisodecyl phthalate and 4 pounds of butyl carbitol to 20 pounds of Premix. |
| ATB-2.... A batch made by adding 4.3 pounds of butyl carbitol to 30 pounds 210. |
| ATB-3.... A batch made by adding 4 pounds of diisodecyl phthalate to 30 pounds of Premix. |
| ATB-4.... A batch made by adding 4 pounds of butyl carbitol and 725 g. of silica to 30 pounds of Premix. |
| ATB-5.... A batch made by adding 100 g. of diisodecyl phthalate and 725 g. of silica to 30 pounds of Premix. |

TABLE OF EXAMPLES

| Ingredients | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| --- | --- | --- | --- | --- | --- | --- | --- | --- | --- | --- | --- | --- | --- | --- | --- | --- | --- | --- | --- | --- | --- | --- |
| (1) Accelerators, percent: | | | | | | | | | | | | | | | | | | | | | | |
| 0122 | | | | | | | | | | | 0.4 | | | | | | | 1 | | | | |
| 0201 | | | 2 | | | 2 | | 2 | | 2 | | | 0.5 | 1 | | | | | | | .75 | |
| 0204 | | 2 | | | | | | | 2 | | | | | | | | 1 | | | 2 | | |
| 0206 | 2 | | | 2 | 2 | | 2 | | 2 | | 2 | 2 | 2 | | | | | | 1 | | | 1 |
| (2) Monomers¹: | | | | | | | | | | | | | | | | | | | | | | |
| 0133 | | | | 50 | 50 | 50 | 50 | | | | 50 | 50 | 50 | | | | | | | | | |
| 203 | | | | | | | | | | | 50 | 50 | 50 | | | | | | | | | |
| 210 | | | | 50 | 50 | | | | | | 50 | 50 | 50 | | | | | | | | | |
| 1212 | | | | | | 50 | 50 | | | | | | | | | | | | | | | |
| (3) Cocatalysts, percent: | | | | | | | | | | | | | | | | | | | | | | |
| 0115 | | | | .3 | .3 | .3 | .3 | | | | | | | | | | | | | | | |
| 0325 | | | | | | | | | | | | | | .3 | | | | | | | | |
| 0332 | | | | | | | | | | | .3 | 1 | | | | | | | | | | |
| (4) Base Batches¹: | | | | | | | | | | | | | | | | | | | | | | |
| 1000 | 100 | 100 | 100 | | | | | | | | 100 | 100 | 100 | | | | | | | | | |
| ATB-1 | | | | | | | | | | | | | | 100 | 100 | | | | | | | |
| ATB-2 | | | | | | | | | | | | | | | | 100 | | | | | | |
| ATB-3 | | | | | | | | | | | | | | | | | 100 | 100 | | | | |
| ATB-4 | | | | | | | | | | | | | | | | | | | | | 100 | 100 |
| ATB-5 | | | | | | | | | | | | | | | | | | | 100 | 100 | | |

¹ Reported as parts by weight.

The formulations of Examples 1 through 13 were subjected to a "finger-tight" locking test. Accordingly, 3 small drops of each formulation were dispensed on the exposed threads of a plurality of separate degreased 3/8–24, 1 inch medium carbon steel cap screws on each of which a degreased medium carbon steel nut had been threaded up close to the cap screw head. The nut was then backed off until it was within the area of threads to which the formulation had been applied. The cap screw was then placed head down on a level surface and allowed to stand. Every 30 minutes a different cap screw for each formulation was checked until one was found to be "finger tight,"

i.e., the nut could not be manually turned relative to the cap screw without the aid of a wrench or other tool.

Accelerated shelf life tests were also conducted on samples of Examples 1–15 in order to determine the storage stability of representative compositions. In accordance with the test procedure, each composition, in its polyethylene bottle, was aged in an oven maintained at about 81° to 82° C. If the composition gelled, the time was noted. The test is an accelerated aging test and, as a correlation of the test procedure with actual storage conditions, a sealant composition free from gelling after 30 minutes under the aging conditions of the test will also be free from gelling under ambient or room temperature for at least one year. None of the samples gelled within 30 minutes and many showed stability after extended periods of time.

Additional cap screws were prepared as above for some of the examples for the purpose of testing the strength of the bonds between the nuts and cap screws after 24 hours and in some cases at 90 minutes and 6 hours. After expiration of the time intervals given below in Table I, the head of the appropriate cap screw was held in a vise with the shank of the cap screw disposed vertically. A torque wrench was applied to the nut, and the torque required to dislodge the nut was noted. The results are an average of three to five tests. The results of the "finger tight," 24 hour torque and stability tests for Examples 1–13 were as follows:

TEST RESULTS

| Example: | Time to "Finger tight," min. | Torque, 24 hours, in./lb. | Stability 82° C., min. |
|---|---|---|---|
| 1 | 20 | 128 | 90 |
| 2 | 20 | 150 | 90 |
| 3 | 20 | 174 | 90 |
| 4 | 100 | 112 | 90 |
| 5 | 100 | 60 | 90 |
| 6 | 20 | 127 | 1 60 |
| 7 | 20 | 144 | 1 60 |
| 8 | 30 | 168 | 90 |
| 9 | 60 | 156 | 90 |
| 10 | 60 | 156 | 90 |
| 11 | 60 | 71 | 90 |
| 12 | 60 | 96 | 90 |
| 13 | 40 | 80 | 90 |

1 Gelled at 90 minutes.

Examples 14 to 22 were also tested for "finger tight" time and 24 hour torque substituting cadmium plated bolts and nuts for the steel ones. These examples were further tested for stability by an extended aging test at 120° F. for 10 days and examined for gelling. Results are reported below.

TEST RESULTS

| | Viscosity, c.p.s. | Time to "finger tight," min. | | Torque, 24 hours, in./lb. | | Stability | |
|---|---|---|---|---|---|---|---|
| | | Steel | Cadmium | Steel | Cadmium | 82° C., min. | 10 days at 120° F. |
| Example: | | | | | | | |
| 14 | 100,000+ | 130 | 140 | 30 | 9 | 90 | No gelling. |
| 15 | 400,000+ | 80 | 60 | 21 | 23 | 90 | Do. |
| 16 | 12 | 110 | 30 | 56 | 61 | 2 30 | Do. |
| 17 | 142 | 60 | 80 | 71 | 69 | 60 | Do. |
| 18 | 145 | 20 | 55 | 79 | 83 | 2 60 | Do. |
| 19 | 100,000+ | 30 | 60 | 118 | 88 | 90 | Do. |
| 20 | 28,000 | 20 | 40 | 159 | 85 | 90 | Do. |
| 21 | 400,000+ | 50 | 40 | 66 | 68 | 90 | Do. |
| 22 | 400,000+ | 60 | 60 | 70 | 65 | 90 | Do. |

1 Gelled at 60 minutes.
2 Gelled at 90 minutes.

The temperature conditions during the preparation and testing of all sealant compositions hereinabove were in the range of about 70° F. to 75° F.

Although the oxyalkylamine compounds used in the above examples are preferred because of their commercial availability or ease of manufacture, as further specific examples of formulations of this invention other similar oxyalkylamine compounds as described generally above can be substituted for acceleration in any of the examples with similar results. Thus, the working examples of the invention encompasses, but are not limited to, the use of all accelerators listed herein above, since each is effective.

As additional examples of suitable formulations, the above examples are repeated except that the monomer is replaced with polyethylene glycol diacrylate, tetrahydrofurfuryl chloracrylate, dimethylaminoethyl methacrylate, butylaminoethyl methacrylate, or other room temperature curing acrylic monomers or mixtures of such monomers. The oxyalkylamine compounds have an accelerating effect on each such sealant formulation.

The sealant compositions of this invention can be used to bond similar or dissimilar metal surfaces. The surfaces are usually ferrous metal surfaces, although the compositions are useful in bonding such other metals as brass, copper and tin. Zinc and cadmium, used as corrosion resistant coatings on other metals, are less active metals and may require the use of a primer to activate the metal before applying the sealant. Suitable such primers are available commercially.

Many advantages of the present sealant composition have been discussed above; briefly, there is provided a sealant composition which is shelf stable for a extended period of time but which sets up when closely contacted or confined between metal surfaces. The sealant compositions are receptive of and compatible with a variety of addition agents, including a full range of plasticizers, e.g., esters of phthalic acid, waxy plasticizers, etc., thixotroping agents such as a silica gel, e.g., Cab-O-Sil, and a variety of other monomers and soluble polymers.

It has previously been proposed by V. K. Krieble in U.S. Patent No. 3,041,322 to use "triorganoamines" as accelerators for t-butyl hydroperoxide polymerization of certain di- and tri-esters of acrylic acid and specific alkylene and polyalkylene glycols and glycerols, defined by a structural formula in that patent, in shelf stable sealant compositions. This patent requires that the amine be one in which all three valences of the nitrogen atom are satisfied by carbon atoms, and that there be no hydrogen on the amine nitrogen. The present accelerators are in direct controversion of the above requirements since they are amines which can have hydrogen on the amine nitrogen and are not "triorganoamines" and they still operate successfully as shelf stable compositions.

All percentages given herein are percentages by weight unless otherwise indicated.

The foregoing detailed description is given for clearness of understanding only and no unnecessary limitations are to be understood therefrom, as some modifications will be obvious to those skilled in the art. Advantageously, the accelerator system provided by the present invention is compatible with and useful in combination with t-butyl hydroperoxide, as well as other peroxidic catalysts, for accelerating room temperature cure without materially adversely affecting room temperature storage life of the mixed monomer hydroperoxide and accelerator.

We claim:
1. A shelf stable liquid sealant composition which is shelf stable under room temperature storage conditions and nonsetting at about 81° to 82° C. for at least 30 minutes in isolation from contact with metal surfaces and comprising a room temperature reactive liquid acrylic ester monomer selected from the class consisting of diesters of an acrylic acid and a polyhydric alcohol, acrylic esters of cyclic ether alcohols, acrylic esters of amino alcohols, and mixtures thereof, a peroxidic initiator in an amount sufficient to initiate polymerization of said monomer at room temperature and an oxyalkylamine compound having the formula $(H)_mN((CH_2)_x(OR_1)_yOR_2)_n$, wherein $m$ and $n$ are each integers 1 to 2 inclusive, the total of $m$ and $n$ is 3, $x$ is an interger 1 to 6 inclusive, $y$ is an integer 0 to 6 inclusive, $R_1$ is a lower alkyl chain and $R_2$ is a lower alkyl group, in an amount sufficient to accelerate the polymerization of said monomer at room temperature on confinement of said sealant between closely facing metal surfaces without adversely affecting storage stability.

2. The composition of claim 1 wherein said oxyalkylamine compound is selected from the class consisting of diglycolamine, methoxypropylamine, ethoxyethoxypropyl amine and ethoxyethoxyethoxypropyl amine.

3. The composition of claim 1 wherein said oxyalkylamine compound is present in an amount of from .1 to 5 weight percent based on said monomer.

4. The composition of claim 1 wherein said peroxidic initiator is an organic hydroperoxide.

5. The composition of claim 1 wherein said peroxide initiator is t-butyl hydroperoxide.

6. A laminate structure comprising separate members having closely facing ferrous metal surfaces and a layer of the composition of claim 1 set between said surfaces and securing said members as a unit.

7. A laminate structure comprising separate members having closely facing ferrous metal surfaces and a layer of the composition of claim 2 set between said surfaces and securing said members as a unit.

8. A method of adhering closely facing metal surfaces, which method comprises interposing between said surfaces the liquid composition of claim 1 and permitting said surfaces to stand at ambient conditions until said composition is set.

9. A method of adhering closely facing metal surfaces, which method comprises interposing between said surfaces the liquid composition of claim 2 and permitting said surfaces to stand at ambient conditions until said composition is set.

References Cited

UNITED STATES PATENTS

| 2,268,611 | 1/1942 | Mitchell | 260—86.1 |
| 2,464,826 | 1/1949 | Neher et al. | 260—86.1 |
| 2,485,270 | 10/1949 | Folt | 260—86.1E |
| 3,041,322 | 6/1962 | Krieble | 260—89.5 |
| 3,203,941 | 8/1965 | Krieble | 260—86.1 |
| 3,249,656 | 5/1966 | Kalinowski | 260—885 |
| 3,331,810 | 7/1967 | Lee | 260—86.1 |
| 3,331,812 | 7/1967 | Lee | 260—86.1 |

HARRY WONG, JR., Primary Examiner

U.S. Cl. X.R.

117—132; 156—327, 331, 332; 161—218; 260—31.8, 33.4, 41, 78.5, 80.3, 80.72, 86.1, 88.3, 88.5